United States Patent
Olson et al.

[19]

[11] Patent Number: 6,157,751
[45] Date of Patent: Dec. 5, 2000

[54] METHOD AND APPARATUS FOR INTERLEAVING A PARALLEL IMAGE PROCESSING MEMORY

[75] Inventors: Steven J. Olson, Portland; Robert C. Hinz, West Linn; Kurt M. Anderson, Molalla, all of Oreg.

[73] Assignee: Cognex Corporation, Natick, Mass.

[21] Appl. No.: 09/000,906

[22] Filed: Dec. 30, 1997

[51] Int. Cl.[7] .................................................. G06K 9/54
[52] U.S. Cl. ...................................... 382/304; 364/716.04
[58] Field of Search .................................... 382/304, 303; 364/716.04, 716.05; 711/173, 104

[56] References Cited

U.S. PATENT DOCUMENTS

| | | | |
|---|---|---|---|
| 4,208,721 | 6/1980 | Eisenberg | 364/731 |
| 4,471,387 | 9/1984 | Nadler | 358/293 |
| 4,493,105 | 1/1985 | Beall et al. | 382/21 |
| 4,589,067 | 5/1986 | Porter et al. | 364/200 |
| 4,674,861 | 6/1987 | Kawamura | 355/4 |
| 4,818,932 | 4/1989 | Odenheimer | 324/121 R |
| 4,850,028 | 7/1989 | Kawamura et al. | 382/46 |
| 4,860,375 | 8/1989 | McCubbrey et al. | 382/49 |
| 4,916,640 | 4/1990 | Gasperi et al. | 364/521 |
| 4,922,543 | 5/1990 | Ahlbom et al. | 382/48 |
| 5,033,106 | 7/1991 | Kita | 382/56 |
| 5,115,309 | 5/1992 | Hang | 358/133 |
| 5,134,272 | 7/1992 | Tsuchiya et al. | 235/462 |
| 5,146,340 | 9/1992 | Dickerson et al. | 358/213.27 |
| 5,153,846 | 10/1992 | Rao | 364/724.6 |
| 5,153,925 | 10/1992 | Tanioka et al. | 382/52 |
| 5,226,142 | 7/1993 | Vegesna et al. | 395/425 |
| 5,253,308 | 10/1993 | Johnson | 382/49 |
| 5,297,256 | 3/1994 | Wolstenholme et al. | 395/162 |
| 5,315,388 | 5/1994 | Shen et al. | 348/718 |
| 5,347,595 | 9/1994 | Bokser | 382/36 |
| 5,502,775 | 3/1996 | Takeo | 382/169 |
| 5,657,403 | 8/1997 | Wolff et al. | 382/302 |
| 5,758,043 | 5/1998 | Takizawa et al. | 395/115 |

*Primary Examiner*—Yon J. Couso
*Attorney, Agent, or Firm*—William A. Loginov

[57] ABSTRACT

A method and apparatus for accessing image pixel data in a plurality of parallel random access memories (RAMs) includes providing the RAMs so that they are arranged in pairs that each include an even RAM and an odd RAM. Each of the pairs includes an identical copy of the image pixel data stored at identical addresses in each of the RAMs relative to each other. An image processor receives image pixel data from the RAMs over multi-bit data lines. and addresses rows and columns of the pairs so that alternating columns of image pixel data corresponding to alternating pixel columns in an acquired image are stored in an alternating manner in each of an even RAM and an odd RAM. In other words, pixel data of alternating odd pixel columns are stored in succeeding columns in the odd RAM and pixel data of all even pixel columns are stored in succeeding columns in the even RAM.

11 Claims, 7 Drawing Sheets

METHOD AND APPARATUS FOR INTERLEAVING A PARALLEL IMAGE PROCESSING MEMORY

FIELD OF THE INVENTION

This invention relates to the processing of image data stored in a plurality of parallel random access memories (RAMs) and more particularly to a method and apparatus for accessing multiple copies of the image data.

BACKGROUND OF THE INVENTION

In machine vision applications, it is common to acquire image data related to the surface of a workpiece and to store this data for further processing. Stored image data is used for pattern-recognition, error detection and other surface inspection applications. FIG. 1 details a basic image processing arrangement according to the prior art. A camera 30 having a lens 32 for acquiring an image and an electro-optical pickup device, such as a CCD array 34, transmits image data over a data line 36 to a memory device 38. The memory device in this example comprises a random access memory (RAM) configured to receive image data. Data is typically provided in digital form, often following conversion from an analog form by a analog to digital converter (not shown) located in the data path between the CCD array and the image RAM 38. Image data is stored in the image RAM 38 as individual pixels that each represent a given segment of the overall image. Each pixel represents a relatively small part of the total image, such that in aggregate, the image appears relatively continuous. Each pixel has a discrete intensity value that defines a brightness and, when applicable, a shade of color. Where the image is acquired and recorded in color, a pixel may be formed from at least three different-color sub-pixels that form the overall color shade. Alternatively, where the image is monochromatic, a numerical grayscale intensity value is recorded for the pixel. As described further below, the RAM is organized as a series of rows and columns, each individually addressed by an incoming data line. By addressing the appropriate row and column, all or part of a particular pixel intensity value can be accessed and read. An image processor 40 that can comprise any acceptable microprocessor or application specific integrated circuit (ASIC) retrieves intensity values as data over a multi-bit data line 42 based upon input pixel addresses transmitted over a multi-bit address line 44. Model or "template" image data, representative of an image to be compared to the acquired image, can be input to the processor through a variety of input lines denoted generally as the input line 48. The processor matches the model data to the acquired data stored in the RAM 38. The processor, using known techniques, calculates an overall match of the acquired data with the known data by combining the results of each individual pixel-by-pixel match performed by the processor. Results of matches made by the processor are output on an output line 50 to other processors or computers. These processors utilize the output data to perform more advanced operations such as overall pattern recognition.

In another example, the processor can acquire several pixels over the RAM data line 42 that are adjacent each other and, based upon these adjacent pixels, derive modified pixel values (such as average values for all pixels in a group) that are output on the output line 50. These values can be returned through a return line 52 (shown in phantom) to the RAM 38 for restorage. Appropriate addressing functions provided by the processor 40 can facilitate storage of the modified pixel values in the appropriate locations in the RAM.

The image processing arrangement of FIG. 1 enables pixel data to be accessed in the RAM in a largely serial manner. That is, only one pixel data can be read from the RAM to the processor in each addressing cycle. Some microprocessor arrangements such as the well-known Pentium® MMX® microprocessor available from Intel Corp. can access several pixel data simultaneously. For example the forenamed microprocessor uses a single address to access eight sequential eight-bit pixel data in one clock cycle. However, this arrangement has a limitation in that it requires all pixels data to be stored adjacent to each other in the RAM. Hence, to process a group of pixels widely spaced in two dimensions of an image, or at remote spacings from each other, the processor must address pixel data over several clock cycles. This slows the image processing procedure. Speed is a concern in a high-speed machine vision environment in which a large volume of data must be managed by the processing system continuously.

It is, therefore, an object of this invention to provide a more efficient method and apparatus for accessing multiple pixels in an image processing memory array using a reduced number of memories.

SUMMARY OF THE INVENTION

This invention overcomes disadvantages of the prior art by providing parallel access by an image processor to a set of image memory devices in an array of the memory devices each having a similar or identical set of image pixel data stored therein at similar or identical memory addresses in a manner that maximizes use of memory space. The storage configuration according to this invention ensures that image pixel data are retrieved from every memory device in each address cycle. In particular, a group of identical pixel data are stored at identical addresses in a plurality of interleaved buffers. Each interleaved buffer consists of two discrete random access memories (RAMs). The RAMs are designated as both odd RAMs and even RAMs. The pixel data of the entire acquired image is divided among an array consisting of pairs of odd and even RAMs, according to a preferred embodiment. Specifically, the image pixels are divided into a grid of columns and rows. Image pixel data is preferably stored in the odd and even RAMs of each buffer so that alternating columns of pixels (e.g. odd columns and even columns) are stored in succession in the respective memory columns of each of the odd and even RAMs. By way of example, the resulting storage arrangement in the odd and even RAMs produces two separate stored images that, if displayed, appear to have the full number of rows (e.g. height) as the original acquired image, but that each have one-half the number of columns (e.g. one-half the original image width).

According to a preferred embodiment, a method and apparatus for accessing image pixel data in a plurality of parallel random access memories (RAMs) includes providing the RAMs so that they are arranged in pairs that each include an odd RAM and an even RAM. Each of the pairs includes an identical copy of the image pixel data stored at identical addresses in each of the RAMs relative to each other. An image processor receives image pixel data from the RAMs over multi-bit data lines, and addresses rows and columns of the pairs so that alternating columns of image pixel data corresponding to alternating pixel columns in an acquired image are stored in an alternating manner in each of an odd RAM and an even RAM. In other words, pixel data of alternating odd pixel columns are stored in succeeding columns in the odd RAM and pixel data of all even pixel columns are stored in succeeding columns in the even RAM.

The data lines can be paired so that a data line for each odd RAM in a pair is combined with a data line for the even RAM of the pair. The paired data lines are interconnected with a cross-over structure, which is, in turn interconnected with dedicated inputs of the processor. The odd and even RAMs each receive all address bits except the lowest order address bit for each address generated by the processor. The lowest order address bit of each odd RAM is used to operate at least one of the cross-over structures to route data from each of the paired data lines to each of two dedicated inputs of the processor.

According to an alternate embodiment, the odd and even RAMs can be arranged so that alternating rows of pixel data corresponding to alternating rows of pixels of the acquired image are stored in rows of alternating odd and even RAMs. The storage and addressing of rows according to this alternate embodiment is substantially the same as the method and apparatus that stores alternating columns, described above.

According to another alternate embodiment, both rows and columns can be stored in an alternating manner in four RAMs, that are each addressed by the processor. Additionally, a column and/or row address expander can be used in conjunction with any of the above-described embodiments to enable the processor to generate a plurality of related addresses from one central address. This improvement enables the number of processor I/O pins to be substantially reduced.

BRIEF DESCRIPTION OF THE DRAWINGS

The foregoing and other objects and advantages of the invention will become more clear with reference to the following detailed description as illustrated by the drawings in which.

DETAILED DESCRIPTION

Figure 2:
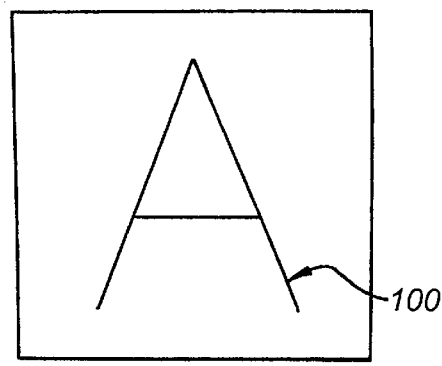
FIG. 2 is a schematic diagram of an exemplary image as acquired by the camera.

For purposes of explanation, a generalized image is shown schematically in FIG. 2. The image 100 consists of the letter "A" surrounded by a uniform background. It is assumed that the camera acquires this image, and transmits it in eight-bit form to the processing system's memory array. The image is transmitted as a series of pixel data, representing particular shades of light and dark, and where applicable, color. Following storage in the memory, the pixel data can be reassembled by the processor into all or part of the letter A as shown.

Applicants' copendinding US patent application entitled Method and Apparatus for Address Expansion in a Parallel Image Processing Memory discloses an image processing system that effectively enables a plurality of pixels of an image to each be independently accessed by a processor in the same addressing cycle. A memory array comprising a plurality of buffers arranged in a series of array rows and array columns is employed. The buffers each consist of two identical 512K RAMs since a single RAM may not have sufficient space to store the pixel data for an entire image. In general, the image is divided between the two RAMs of a given buffer. There are shown twelve buffers, totalling twenty four RAMs in the above-described co-pending patent application.

Figure 3:
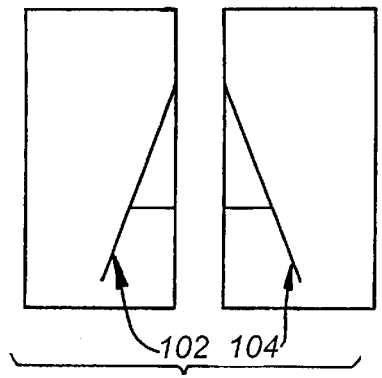
FIG. 3 is a schematic diagram a storage arrangement for the image of FIG. 2 wherein the image is divided approximately equally between two random access memories of a memory buffer.

Referring to FIG. 3, one technique for storing the image, where two RAMs are used for each buffer, is to divide the image evenly between a pair of RAMs based upon the location of the specific pixels in the image. The resulting image pixel data can appear as the two partial images 102 and 104, divided vertically in half. In other words, the first vertical half of the image pixel data fits into the first RAM of the buffer, while the second vertical half of the image pixel data must be located in the second RAM of the buffer. All buffers in the memory array will store an identical copy of the image at the same respective address locations in each of that buffer's two RAMs. Again, even though two RAMs are used in each buffer only one RAM is addressable in each cycle, so only one half or the other half of the image can be accessed at one time in each buffer. And overall, only twelve of twenty four total RAMs are accessed at once (e.g. during one addressing cycle) according to the above-described arrangement.

Figure 4:
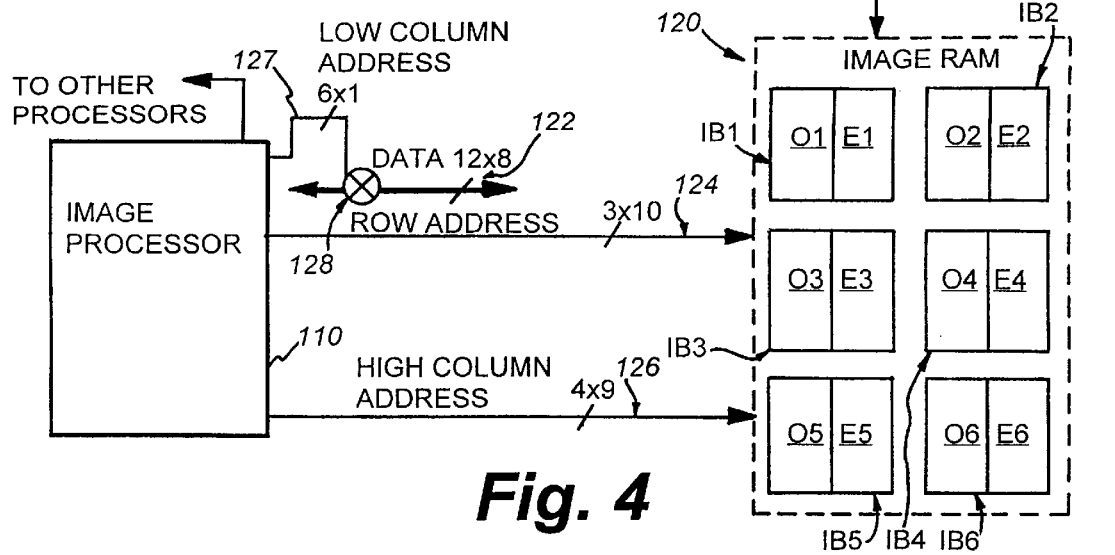
FIG. 4 is a block diagram detailing an image processing system that interleaves even and odd columns of an image stored in a random access memory according to an embodiment of this invention.
Figure 5:
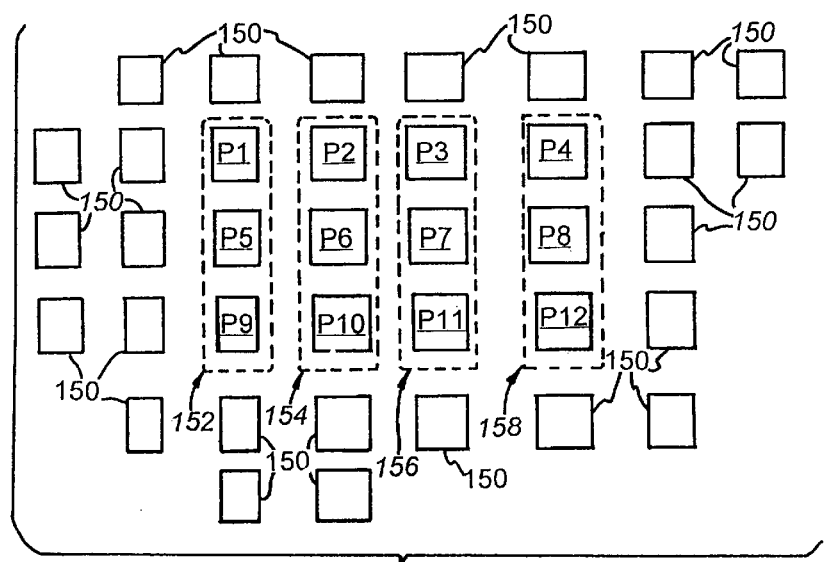
FIG. 5 is an exemplary grouping of adjacent pixels of an image to be processed according to an embodiment of this invention.

It can be desirable in certain applications to reduce the number of overall RAMs in the memory array, where such a reduction does not affect the desired processing of image pixel data. FIG. 4 details an image processing system according to this invention in which the pixel data of an image is not divided in half. Rather, storage of image pixel data is accomplished in an "interleaved" manner. That is, the image pixel data is arranged so that alternating columns of pixels are stored in alternating memories in a pair of RAMs that make up an "interleaved buffer" (IB1–IB6). By "alternating" columns it is meant that the stored columns of image data are derived from corresponding pixel columns in the image that are, themselves, spaced-apart by one intervening column. That is, there is a set of "odd" columns and a set of intervening "even" columns between each of the odd columns. The odd and even columns together make up the entire image.

Figure 1:
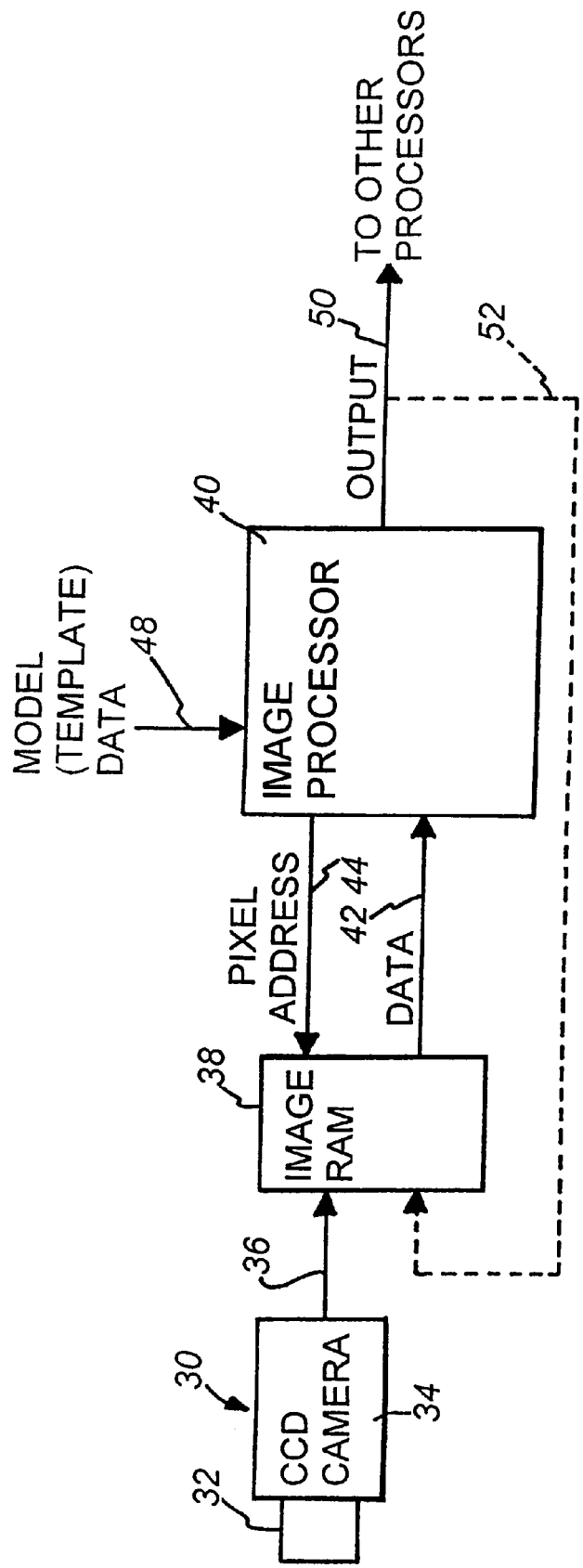
FIG. 1, previously described, is a block diagram of an image processing system according to the prior art.

The image processing system according to this invention receives image signals from a camera, such as the CCD camera element, as shown in FIG. 1 for processing by a dedicated image processor. Likewise, the system of this invention outputs processed data from the processor to other processors and is controlled based upon control and data signals of other processors, as shown in FIG. 1.

According to this embodiment, twelve out of twelve RAMs can be accessed simultaneously by the processor 110. The memory array 120 is organized into the six interleaved buffers IB1–IB6 in which each buffer includes a respective pair of odd RAMs O1–O6 and even RAMs E1–E6. The odd RAMs and the even RAMs are each 512K RAM devices according to an embodiment of this invention. They are accessed to read and write pixel data by twelve independent eight-bit data lines 122 that are grouped in pairs in a manner described further below. The rows of the buffers in the array are addressed by six separate ten bit row address lines 124 interconnected with the processor 110. A total of four separate columns in the array of this embodiment (two even RAMs and two odd RAMs) are addressed by a set of four nine-bit address lines 126. These lines carry four of the highest nine address bits for each column. The lowest address bit for each column is routed over a six-bit low address line 127 to a cross-over structure 128 that selectively crosses over the outputs of the even and odd RAMs of each buffer depending upon the value (1 or 0—even or odd) of the lowest address bit for each column. Briefly, the cross-over structure 128, consists of a group of six multiplexer circuits (described further below) that switch the data between pairs of even and odd RAM data lines (six pairs in all) as the low column address of each column alternates between an even and odd value. The function of the cross-over structure is described in more detail below. In summary, it ensures that pixel data read from each column in the array is properly routed to the correct pixel data input on the processor regardless of whether the pixel data is from an even RAM or odd RAM.

For a better understanding, reference is made to the exemplary grouping of image pixels 150, as they would be organized in an image. The grouping to be processed in the processor in a particular address cycle comprises four columns 152, 154, 156 and 158 of adjacent pixels (P1, P5 and P9), (P2, P6 and P10), (P3, P7 and P11) and (P4, P8 and P12) respectively. Each column includes three pixels, overall defining three rows for the grouping. The orientation of the pixels need not be adjacent, any function or relationship can be used to define the locations of pixels in a grouping. For the purposes of simplicity, a basic four by three grid is illustrated. Assume that pixel data for the pixels in columns 152 and 156 are deemed to have odd address values in each of the RAMs and that alternating columns 154 and 158 are deemed to have even address values in each of the RAMs. In this embodiment, the odd RAMs O1–O6 store six identical copies of pixel data of columns 152 and 154 at identical address locations in each odd RAM. The even RAMs E1–E6 store six identical copies of pixel data of columns 154 and 158 at identical address locations in each even RAM. All other image pixel data is likewise stored so that all odd columns are stored at identical address locations in all odd RAMs and all even columns are stored at identical address locations in the odd RAMs. Structurally, the column and row addresses in every RAM are unchanged, being alternating even and odd, but this arrangement allows the processor to address the data so that the columns are divided into even and odd alternating columns between RAMs. This is the function of the cross-over structure that uses the lowest order column bit to control even and odd addressing.

Note, while the image data acquired by the camera is loaded into each of the separate buffers according to this invention so that the pixel data can be accessed in parallel, the data in each buffer need not be identical in the absolute sense. FIG. 4 shows an optional block for preprocess operations 250 located between the memory array and the camera on the twelve-by-eight data line. Each buffer can, in fact, be loaded with a somewhat different preprocessed group of image pixel data. For example, buffer IB1 can receive data that is smoothed by a Gaussian or other function, while buffer IB2 can receive data smoothed by a different function, or not at all. The data in each buffer is therefore a "version" of the image data originally acquired by the camera. The pixels may be located at the same address locations or near these locations, but their actual data values may vary depending upon the form of preprocess operation applied to each buffer input. Likewise, the processor can be arranged to account for differences in data entering from different buffers. For example, data entering the processor from IB1 can be used for vertical edge detection while data entering from IB2 can be used for horizontal edge detection. Such a variable use of stored data is expressly contemplated.

Figure 6:
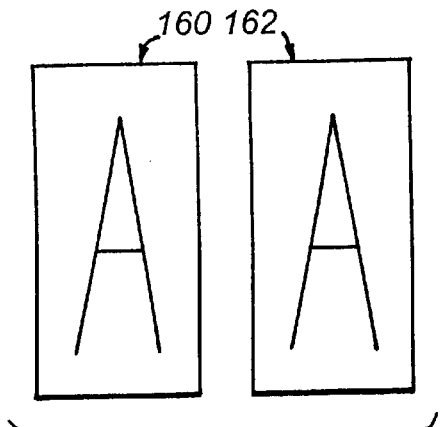
FIG. 6 is a schematic diagram of a typical storage arrangement for the image of FIG. 2 utilizing a column interleaving storage arrangement utilizing the image processing system embodiment detailed in FIG. 4.

Before describing the cross-over structure in further detail, reference is further made to FIG. 6. According to the system embodiment architecture shown in FIG. 4, the image in each of two RAMs is divided vertically into two half images, a first half 160 having all the odd column pixel data and a second half 162 having all the even column pixel data. Note each image is a horizontally compressed version of the acquired image 100 of FIG. 2, since each RAM of the even/odd interleaved buffer pair stores the entire row dimension of the image, but only one half of the column dimension. This compression assumes that at leas two adjacent pixels exist for most of the visible elements in the image. Otherwise the pixel(s) making up the visible element would appear only in one of the two compressed images. Even if the image does not appear in both compressed halves, the principles described herein are still applicable. Thus, unlike the direct split of the image as shown in FIG. 3, the image of FIG. 6 is evenly distributed, row-by-row, between the RAMs. By storing alternating adjacent columns, data relevant to a localized grouping of pixels can be accessed at once from both RAMs of each buffer pair. In other words, the separate RAMs of the pair always contain pixel data for columns of pixels that are close to each other. Both RAMs can be accessed simultaneously to obtain data of adjacent (or closely related) pixels at all times. This contrasts directly with the image storage arrangement of FIG. 3 in which the data in one RAM of a buffer is on the opposite side of an image from the data of another RAM. In the prior art arrangement, the data of only one RAM in each buffer generally yields data useful for processing a localized group of pixels. Conversely the interleaving arrangement of the present invention allows all buffers to simultaneously yield data of a localized grouping of pixels.

Figure 7:
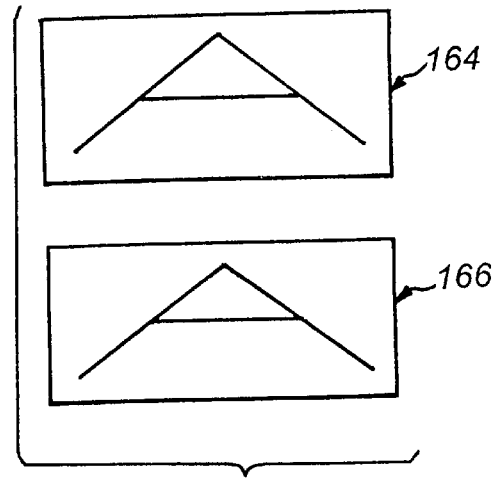
FIG. 7 is a schematic diagram of a typical storage arrangement for the image of FIG. 2 utilizing a row interleaving storage arrangement according to an alternate embodiment of this invention.

With reference also to FIG. 7, it is expressly contemplated that row interleaving can be implemented as according to this invention rather than column interleaving as described above. The image would be divided horizontally between two half images 164 and 166 that are compressed by rows as shown. In the system of FIG. 4, row interleaving would be implemented by addressing all ten bits of each of the four array columns in the memory array 120. An even number of array rows is desirable. Assuming four array rows were used, these array rows would alternate odd and even, each storing an identical copy of all odd array rows and all even array rows of the image pixel data, respectively. The crossover structure is employed between pairs of data lines, and would be controlled by the lowest order bit of the row addresses to switch the outputs of even and odd array rows based upon the current value (even or odd) of the RAM row addresses.

Figure 8:
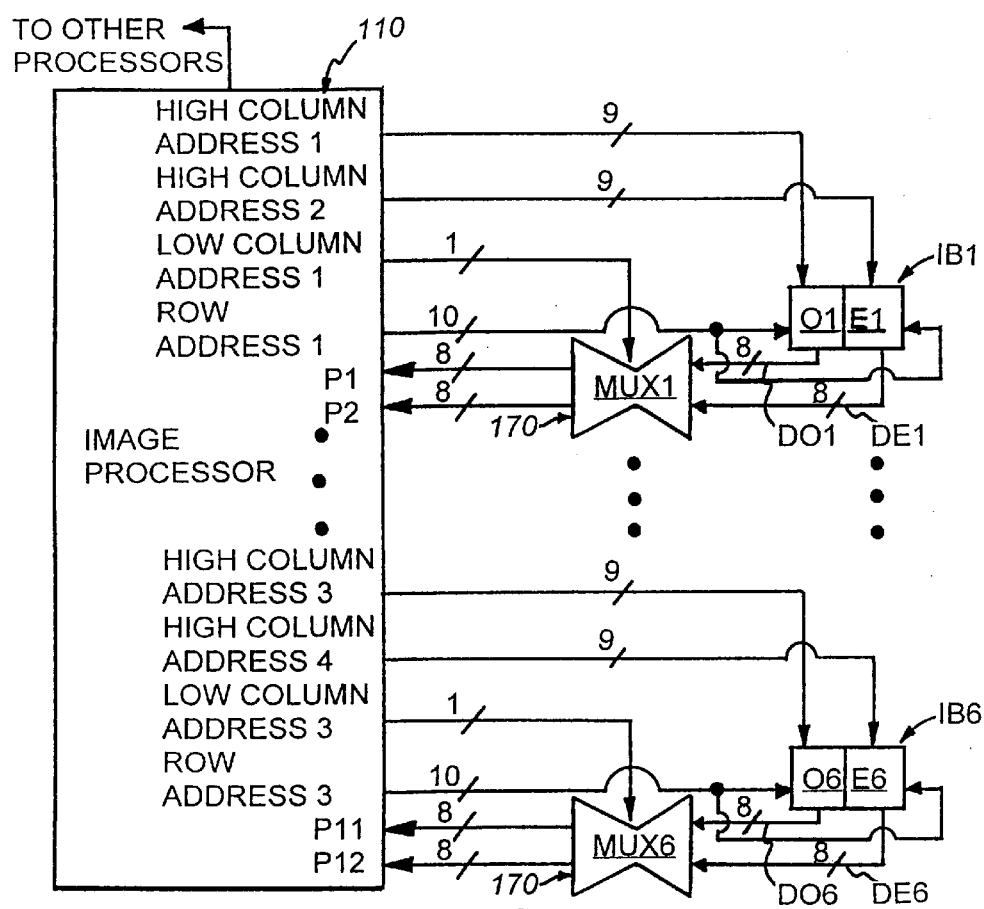
FIG. 8 is a more detailed schematic diagram of the image processing system of FIG. 4.

FIG. 8 details the column interleaving processing system of FIG. 4 in greater detail. For simplicity, the interleaved first buffer pair IB1, comprising even and odd RAMs O1 and E1 is shown and the last interleaved buffer pair IB6 comprising even and odd RAMs ) O6 and E6 is also shown. It is assumed that all other buffer pairs IB2–IB5 are also interconnected to the processor 110 in the according to the illustrated arrangement. As discussed above, the interleaved buffers each store an identical copy of each image, with all odd columns stored in the odd RAM and all even columns stored in the even RAM. Related columns, such as the column containing data for pixel P1 and the column containing data for pixel P2 are, in fact, stored the same or adjacent addresses in each of the even and odd RAMs O1 and E1. In general, each even and odd column of pixels is stored in an adjacent column address in its respective RAM. One goal of a parallel memory array according to this invention is to allow an entire grouping of adjacent pixels P1–P12 to be simultaneously addressed by the processor. Each of the twelve RAMs is, therefore, addressed to provide one of the twelve desired pixels in a single address cycle. In this example, HIGH COLUMN ADDRESS1 and ROW ADDRESS1 access P1 from odd RAM O1. HIGH COLUMN ADDRESS 2 and ROW ADDRESS 1 access P2 from even RAM E1, etc. Likewise, HIGH COLUMN ADDRESS 3 and ROW ADDRESS3 access P11 from odd RAM O6 and HIGH COLUMN ADDRESS4 and ROW ADDRESS3 access P12 from even RAM E6. The processor is arranged to generate a set of row addresses and high column addresses that access a set of adjacent, or related pixels, according to a desired grouping pattern on any part of the overall image.

In this embodiment, each eight-bit data line from a respective interleaved buffer IB1–IB6 is routed through an independent cross-over structure 170 designated MUX1 through MUX6, respectively. In particular, a pair of eight-bit data lines DO1 and DE1 interconnect the odd and even RAMs O1 and E1, respectively. This pair is routed to MUX1. Likewise, each other pair of even and odd data lines is routed to an associated cross-over structure, including DO6 and DE6, which are routed to MUX6.

Figure 9:
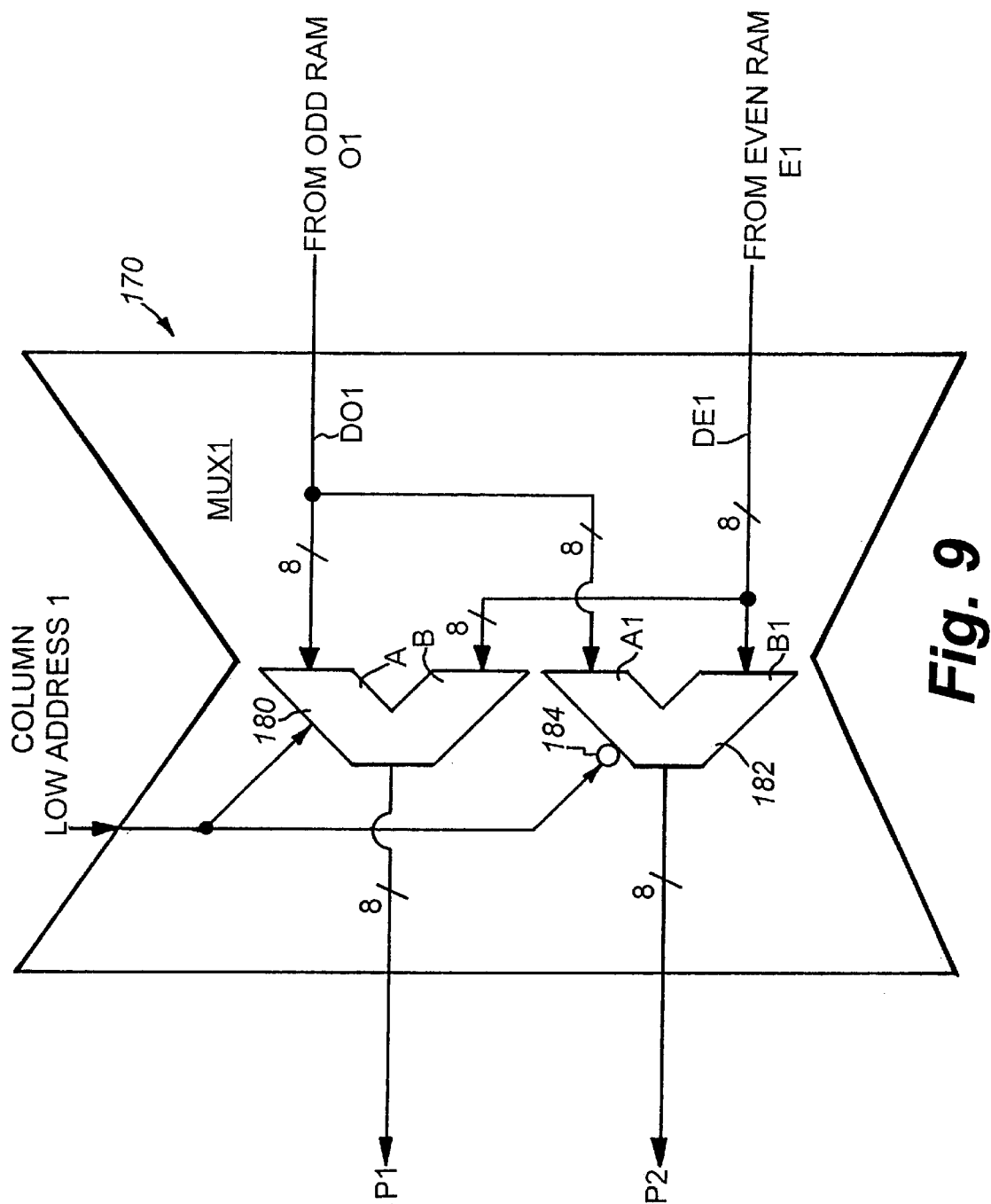
FIG. 9 is a more detailed diagram of an inverting dual-multiplexer as shown in FIG. 8.

The cross-over structure 170 is shown in greater detail in FIG. 9 with specific reference to MUX1. The odd and even data lines DO1 and DE1 are each input to a pair of multiplexers 180 and 182 of known design and configuration. The multiplexers 180 and 182 are arranged to receive two eight-bit parallel inputs on each of two legs (A and B) and (A1 and B1), respectively. Each multiplexer selects either input line DO1 and DE1, while the other selects the opposite DE1 or DO1, respectively. Selection is based upon the state of the input LOW COLUMN ADDRESS 1 signal. The second multiplexer 182 includes a signal inverter 184 at its selector input, so that it selects the opposite leg relative to the first multiplexer 180. Based upon the state of LOW COLUMN ADDRESS1, the cross-over structure places the output of DO1 on the processor input for P1 or it places the output for DE1 an the processor input for P1. Likewise, either the output of DE1 or DO1, respectively, is placed on P2. The structure 170 can either be constructed from two multiplexers that each switch eight bits, or a plurality of individual switches can be employed to each handle one or more bits (up to sixteen individual multiplexers, eight for each of P1 and P2). It is contemplated that the cross-over structure be reversible so that it works for the depicted reading operation from the RAM and a corresponding writing operation to the RAM. That is, a writing operation from the processor back into the RAMs can be appropriately routed to the desired addresses based upon the state of LOW ADDRESS1 and the associated high column address values for P1 and P2 in each of their respective even and odd RAMs. A separate cross-over structure having an equivalent configuration to that of FIG. 9, but operating in reverse can be employed in an alternate embodiment for writing operations.

In operation, the processor addresses a group of pixels based generally upon a set of rules that assume a continuous odd-even-odd memory structure in each RAM, such as shown in the prior art. The cross-over structure continually selects alternating odd and even columns for adjacent pixels as these pixels are addressed by the processor. As alternating odd and even addresses are generated, the processor expects to receive a series of data from adjacent columns regardless of which RAM (odd or even) the column is stored in. These alternating odd and even addresses provide alternating 0 and 1 values for the lowest address bit which controls the switching of the cross-over structure. Thus, when odd addresses are selected by the processor, pixel data in one input order passes through the cross-over; when even addresses are selected, the pilex data input order is swaped. In particular, the cross-over structure will ensure that the pixel data read from each of the RAMs is provided to the correct input P1, P2 . . . P12 of the processor 110.

Figure 10:
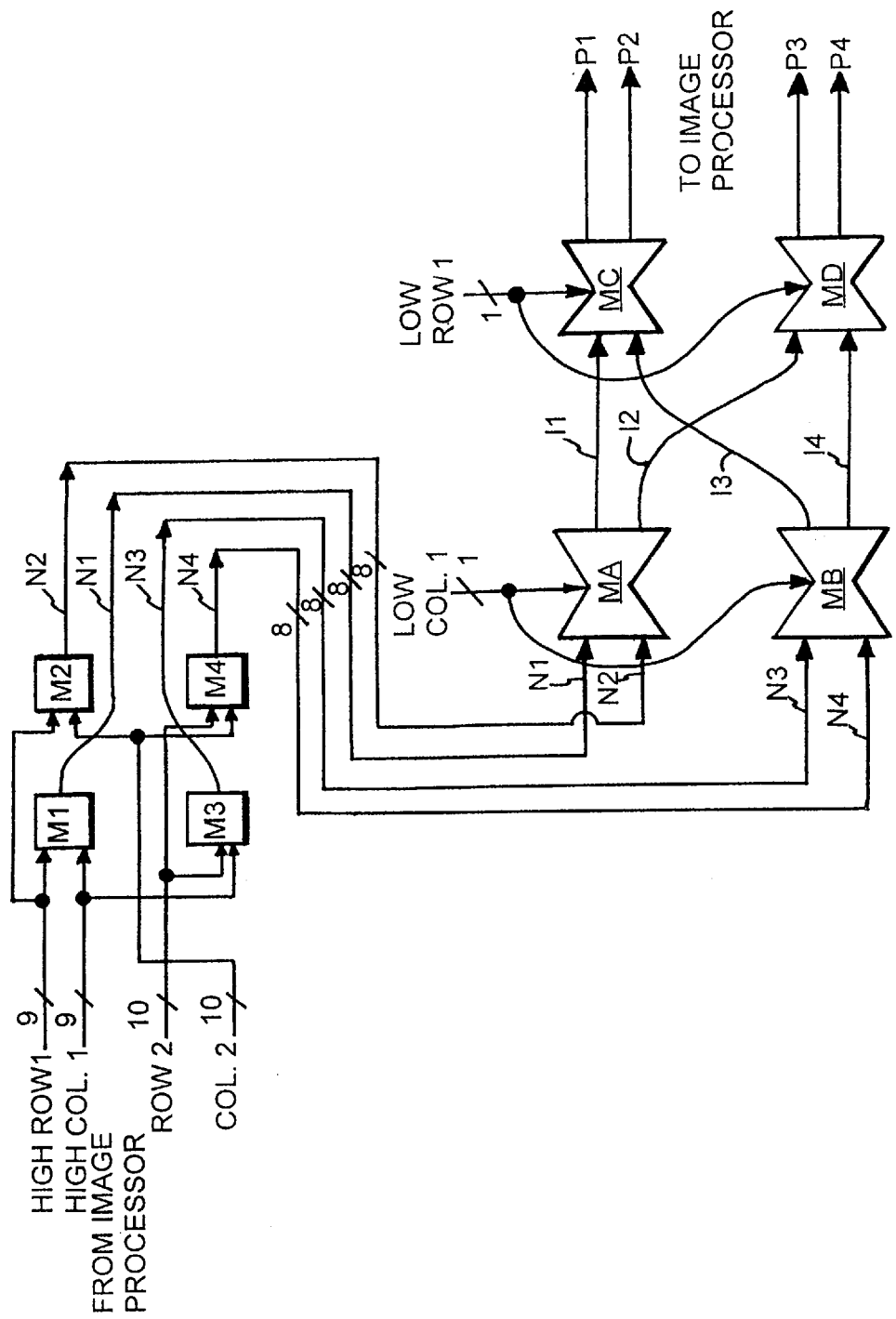
FIG. 10 is a block diagram of an image processing system that interleaves both rows and columns of an image stored in a random access memory according to an alternate embodiment of this invention.
Figure 11:
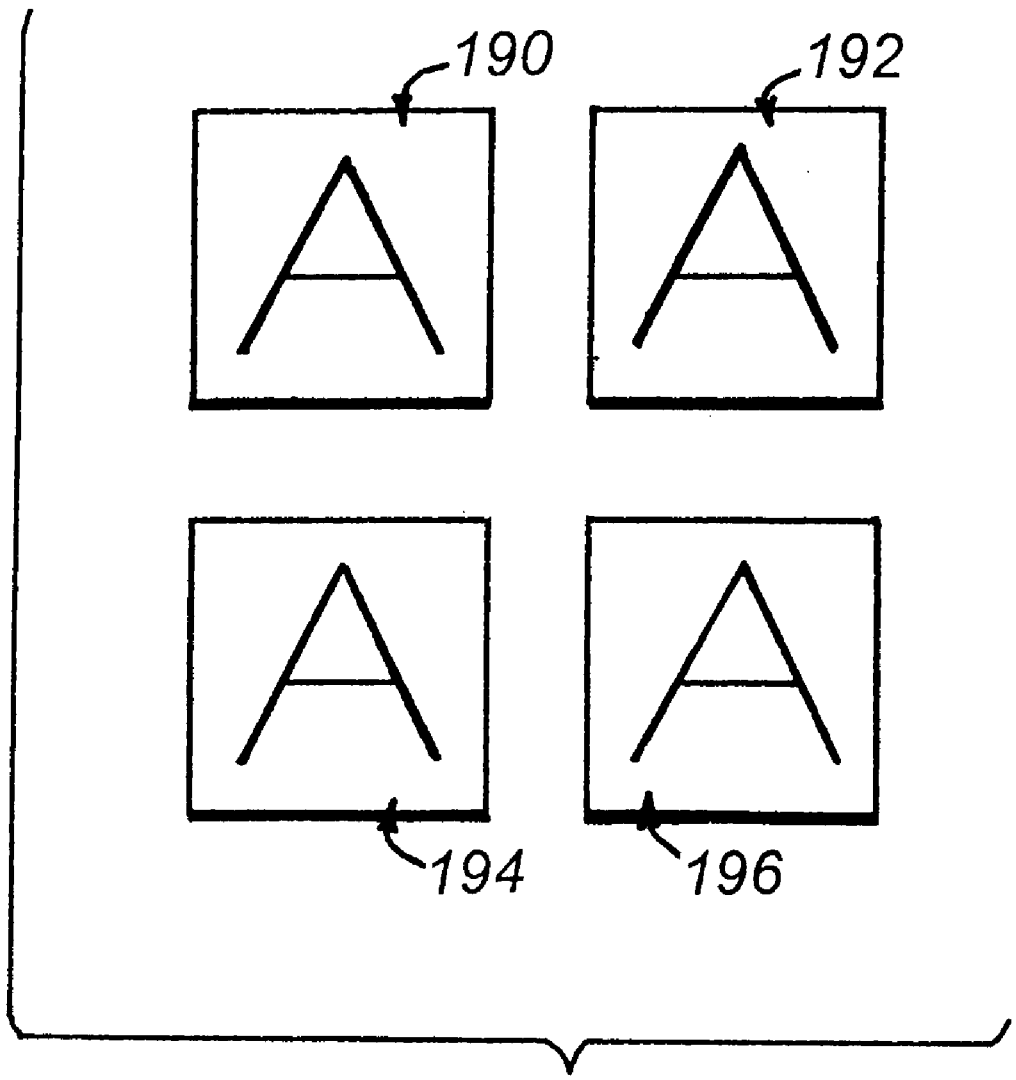
FIG. 11 is a schematic diagram of a typical storage arrangement for the image of FIG. 2 utilizing a row and column interleaving storage arrangement utilizing the system embodiment detailed in FIG. 10.

As described previously, alternating rows or alternating columns of pixel data stored in a memory array can be interleaved according to this invention. FIG. 10 details an embodiment of the processing system of this invention in which both row and column interleaving are employed. In the exemplary embodiment, a set of image data for four pixels P1–P4 is to be addressed by the processor (shown previously). The data are stored in each of four interleaved RAMs M1–M4, respectively. A set of four corresponding eight-bit address lines N1–N4 are used to access addressed data in each of the RAMs M1–M4. The memories M1–M4 are addressed by the processor as follows:

RAM M1 is addressed by the row and column signals HIGH ROW1 and HIGH COL1, each comprising a nine-bit signal;

RAM M2 is addressed by the row and column signals HIGH ROW1 and COL2, wherein COL2 is a full ten-bit signal;

RAM M3 is addressed by the row and column signals ROW 2, a ten-bit signal, and HIGH COL1; and RAM M4 is addressed by the row and column signals ROW2 and COL2.

A number of variations of the above addressing arrangement are expressly contemplated. The goal is to enable both alternating rows and alternating columns of image pixel data to be stored evenly in each of four RAMs M1–M4 of the four-RAM interleaved buffer shown in FIG. 10.

Based upon the used of four interleaved RAMs, the image is approximately equally compressed into four reduced copies 190, 192, 194 and 196. Each of the copies is ¼ th the size of the acquired image of FIG. 2 and approximately congruent to the acquired image. The pixel data of each of the four copies 190, 192, 194 and 196 is stored, respectively, in RAMs M1, M2, M3 and M4 in this example.

The data lines N1 and N2 are interconnected to a first of four cross-over structures MA, MB, MC and MD of a type and function described above. The signal LOW COL1 is used to select the order of the intermediate outputs I1 and I2 from MA. Similarly, the data lines N3 and N4 are interconnected to a second cross-over structure MB. The signal LOW COL1 is also used to select the order of the associated intermediate outputs I3 and I4 from MB.

The intermediate outputs I1 and I3 are then selected by a third cross-over structure MC, using signal LOW ROW1, to establish the proper outputs order for pixel data P1 and P2 into the processor. Likewise intermediate outputs I2 and I4 are switched by the fourth cross-over structure MD, using signal LOW ROW1, to establish the proper order for pixel data P3 and P4 at the processor.

The embodiments described herein effectively lower the "chip count" of the associated image processing system by fully utilizing all RAMs in the memory array at each address cycle. A related concern is the "I/O count." That is, the desire to reduce the number of overall address pins on the processor. Applicants' aforementioned copending U.S. patent Application entitled, Method and Apparatus for Address Expansion in a Parallel Image Processing Memory, further provides a novel technique for converting one address generated by the processor into a plurality of addresses for adjacent or related pixels stored in a memory. The related addresses can be either related row addresses or related column addresses, or both. Typically, a central pixel address is chosen, and a group of related addresses are generated by an address expander. The expander comprises a custom application specific integrated circuit (ASIC) or field programmable gate array (FPGA) that receives offset constants or an offset function from the system, and uses the offset information to generate several related addresses from the one central address the processor provides.

Figure 12:
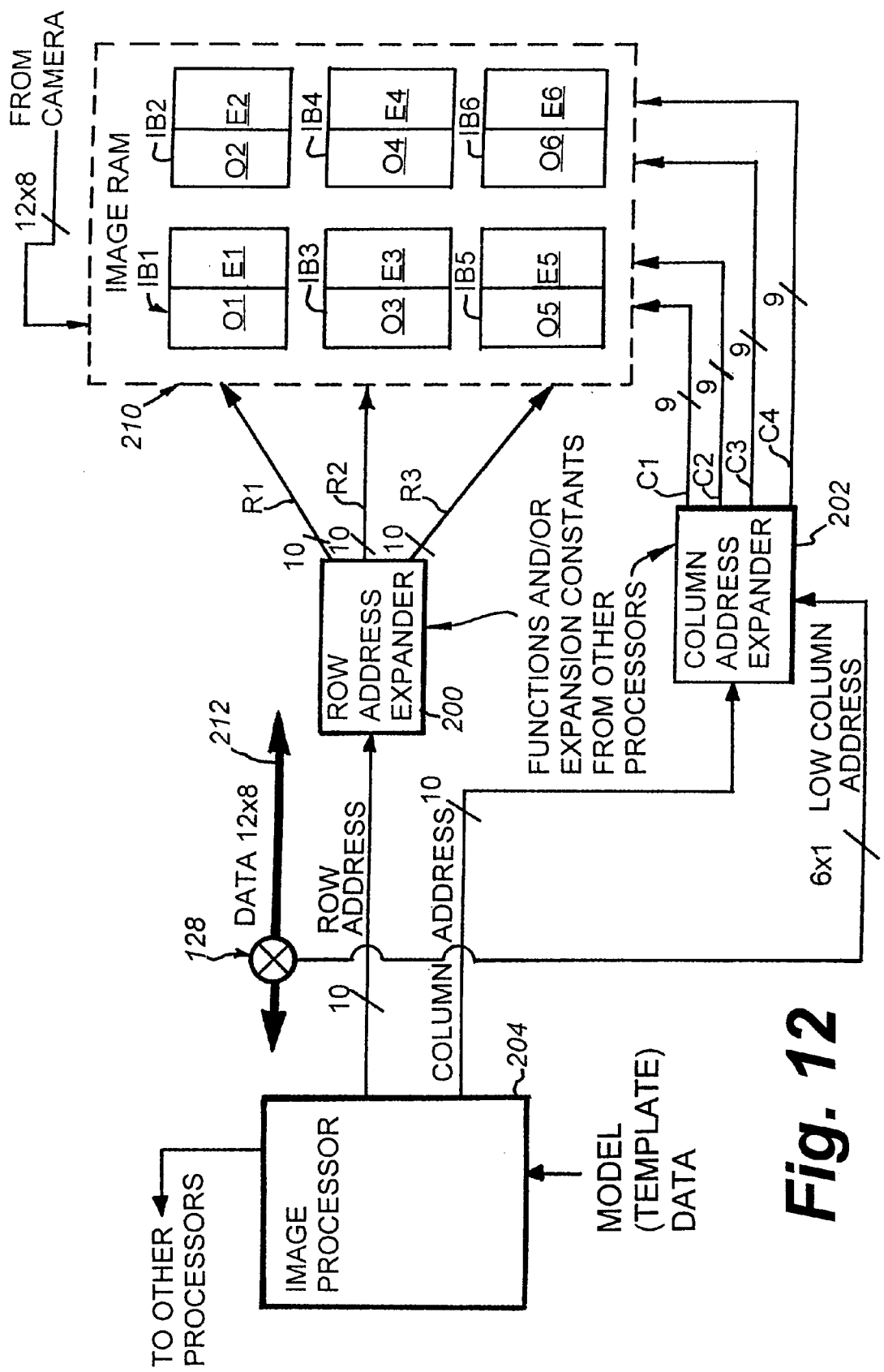
FIG. 12 is a block diagram of an image processing system utilizing row and column address expanders in combination with column interleaving according to an alternate embodiment of this invention.

FIG. 12 details an alternate embodiment of an image processing system that employs a row address expander 200 and column address expander 202 that receive a single ten-bit row address and a single ten-bit column address from the processor 204. The configuration of the illustrated system is largely similar to that of FIGS. 4 and 8 except for the use of address expanders, and the underlying changes to the processor 204 and its address I/O interconnections. Based upon the single row and column addresses, representative of a central pixel data in the stored grouping, the row address expander 200 generates three ten-bit row addresses R1, R2 and R3. Similarly, the column address expander 202 generates four related column addresses C1, C2, C3 and C4. The address of the central pixel is typically one of the R1–R3 and C1–C4 addresses (R2, C2 for example). The row and column address expander offset for the central pixel is typically zero, while offsets for related pixels are values that shift the addresses to adjacent columns and/or rows (e.g. ±1).

The column addresses C1–C4 are each nine-bits wide according to this embodiment, with the low being bit removed from each column address. This is because column interleaving according to this invention is employed. Hence, the memory array 210 includes odd RAMs O1–O6 and even RAMs E1–E6 as described previously. The column address expander includes a bit stripping function of any known configuration that routes the low-order bit of C1 and C3 (addressing the two odd columns of RAMs) back to the cross-over structure 128 on the twelve eight-bit data lines 212. According to the present embodiment, the low order bit of each column address is terminated in the address column expander 202, and not interconnected to the memory array. The low-order bit of C1 is provided to cross-over structures associated with the data line pairs of IB1, IB3 and IB5. Similarly, the low-order bit of C3 is connected to the cross-over structures for IB2, IB4 and IB6. Note that an optional preprocess block 260 can be provided to the camera input data lines 262. The address expanders or processors can be provided with appropriate address information in order to process different versions of the image in each of the buffers according to a desired relationship. Therefore, this arrangement differs functionally from the system detailed in FIGS. 4 and 8 mainly in that the required multiplicity of row addresses and column addresses are provided by the expanders rather than directly by the processor, lowering the number of required processor I/O ports.

The foregoing has been a detailed description of a preferred embodiment of the invention. Various modifications and additions can be made without departing from the spirit and scope of this invention. For example the size of the array of interleaved buffers and the configuration of rows and columns of buffers can be varied to accommodate differently sized and shaped groups of pixels. Any of the embodiments described herein can be combined in whole or part with any other embodiments described herein. Finally, the procedures described herein for column interleaving, where row addressing is unchanged, are equally applicable to row interleaving, where column addressing is unchanged. The terms "column" and "row" can be freely interchanged as used in this description, as the examples showing column interleaving are fully applicable to RAM storage rows. Data from a plurality of cameras can be provided to the array, and, as stated, different versions of the data can be loaded from the camera(s) into the different buffers of the memory array. Accordingly, this description is meant to be taken only by way of example and not to otherwise limit the scope of the invention.

What is claimed is:

1. A system for processing a group of image pixel data arranged in a grid of rows and columns comprising:

a plurality of pairs of random access memories, each of the pairs having an odd random access memory and an even random access memory, each odd random access memory and each even random access memory having identical row address locations and identical column address locations, each of the pairs being constructed and arranged to store the group of image pixel data therein;

an image processor that generates address values for accessing the group of image pixel data over a multi-bit address line and that manipulates the image pixel data, the image pixel data being transferred between the image processor and the random access memories over a data line;

wherein the column address locations of each odd random access memory store a first set of alternating columns of image pixel data from the group of image pixel data, and the column address locations of each even random access memory store a second set of alternating columns from the group of image pixel data, the second set of alternating columns being located between the first set of alternating columns, whereby the first set and the second set together comprise all pixel data of the group of image pixel data; and wherein the image processor is constructed and arranged to generate address values that access pixel data from each of the first set and the second set in a single addressing cycle.

2. The system as set forth in claim 1 wherein the data line comprises a multi-bit data line interconnected between the processor and each even random access memory and each odd random access memory, the data line defining data line pairs between each pair and the processor, and wherein the system further comprises a plurality of cross-over structures that selectively switch an input order of each of the data line pairs into the processor between two selected input orders.

3. The system as set forth in claim 2 wherein the image processor is constructed and arranged to generate column addresses that omit a lowest order bit relative to a number of column address bits specified by each of the random access memories, the lowest order bit of at least one of the column addresses being directed to at least one of the cross-over structures, to thereby select the input order based upon a state of the lowest order bit.

4. The system as set forth in claim 3 wherein the pairs of random access memories are arranged in an array comprising an array column three pairs high and an array row two pairs high, the lowest order bit from each of the odd random access memory of each of the memory pairs in a first array column being directed to the crossover structure interconnected to each data line pair of the first array column and the lowest order bit of the odd random access memory of each of the memory pairs in second array column being interconnected to each data line pair of the second array column.

5. The system as set forth in claim 4 wherein the processor is constructed and arranged to generate four column addresses, whereby there is one column for each array column of odd random access memories and each array column of even random access memories in the single addressing cycle.

6. The system as set forth in claim 5 wherein the processor is constructed and arranged to generate three row addresses, whereby there is one row address for each array row of memory pairs in the single addressing cycle.

7. The system as set forth in claim 3 wherein the processor is constructed and arranged to generate one column address, and wherein the system further comprises an address expander that generates a plurality of related column addresses, directed to the memory pairs, based upon the one column address.

8. The system as set forth in claim 3 wherein the processor is constructed and arranged to generate one column address, and wherein the system further comprises an address expander that generates a plurality of related column addresses, directed to the memory pairs, based upon the one column address.

9. The system as set forth in claim I wherein the processor is constructed and arranged to generate row addresses and column addresses that each access a discrete pixel data from the group of pixel data from each odd random access memory and each even random access memory in the single addressing cycle.

10. A system for processing a group of image pixel data arranged in a grid of rows and columns comprising:
   a plurality of sets of random access memories, each of the sets having a first random access memory, a second random access memory, a third random access memory and a fourth random access memory, each of the random access memories having identical row address locations and identical column address locations, each of the sets being constructed and arranged to store the group of image pixel data therein;
   an image processor that generates address values for accessing the group of image pixel data over a multi-bit address line and that manipulates the image pixel data, the image pixel data being transferred between the image processor and the random access memories over a data line;
   wherein the column address locations and the row address locations of each first random access memory store a first set of alternating columns of image pixel data and alternating rows of image pixel data from the group of image pixel data, and the column address locations and the row address locations of each second random access memory store a second set of alternating columns of image pixel data and alternating rows of image pixel data from the group of image pixel data, and the column address locations and the row address locations of each third random access memory store a third set of alternating columns of image pixel data and alternating rows of image pixel data from the group of image pixel data, and the column address locations and the row address locations of each fourth random access memory store a fourth set of alternating columns of image pixel data and alternating rows of image pixel data from the group of image pixel data; each of the first set, the second set, the third set and the fourth set of alternating columns of image pixel data and alternating rows of image pixel data being a discrete set that in combination include all image pixel data of the group of image pixel data;
   wherein the image processor is constructed and arranged to generate address values that access pixel data from each of the first set, the second set, the third set and the fourth set in a single addressing cycle.

11. A method for processing a group of image pixel data arranged in a grid of rows and columns comprising:
   providing plurality of pairs of random access memories, each of the pairs having an odd random access memory and an even random access memory, each odd random access memory and each even random access memory having identical row address locations and identical column address locations;
   storing a respective version of the group of image pixel data in each of the pairs of random access memories;
   manipulating, with the image processor, the image pixel data, including transferring the image pixel data between the image processor and the random access memories over a data line;
   storing a first set of alternating columns of image pixel data from the group of image pixel data at the column address locations of each odd random access memory, and storing a second set of alternating columns from the group of image pixel data at the column address locations of each even random access memory, the second set of alternating columns being located between the first set of alternating columns, whereby the first set and the second set together comprise all pixel data of the group of image pixel data; and
   generating address values for accessing the group of image pixel data over a multi-bit address line, including generating includes generating address values that access pixel data from each of the first set and the second set in a single addressing cycle.

* * * * *